May 24, 1932. D. E. RICHARDSON 1,859,469
CURRENT MEASURING DEVICE FOR HIGH FREQUENCY CIRCUITS
Filed Oct. 31, 1929
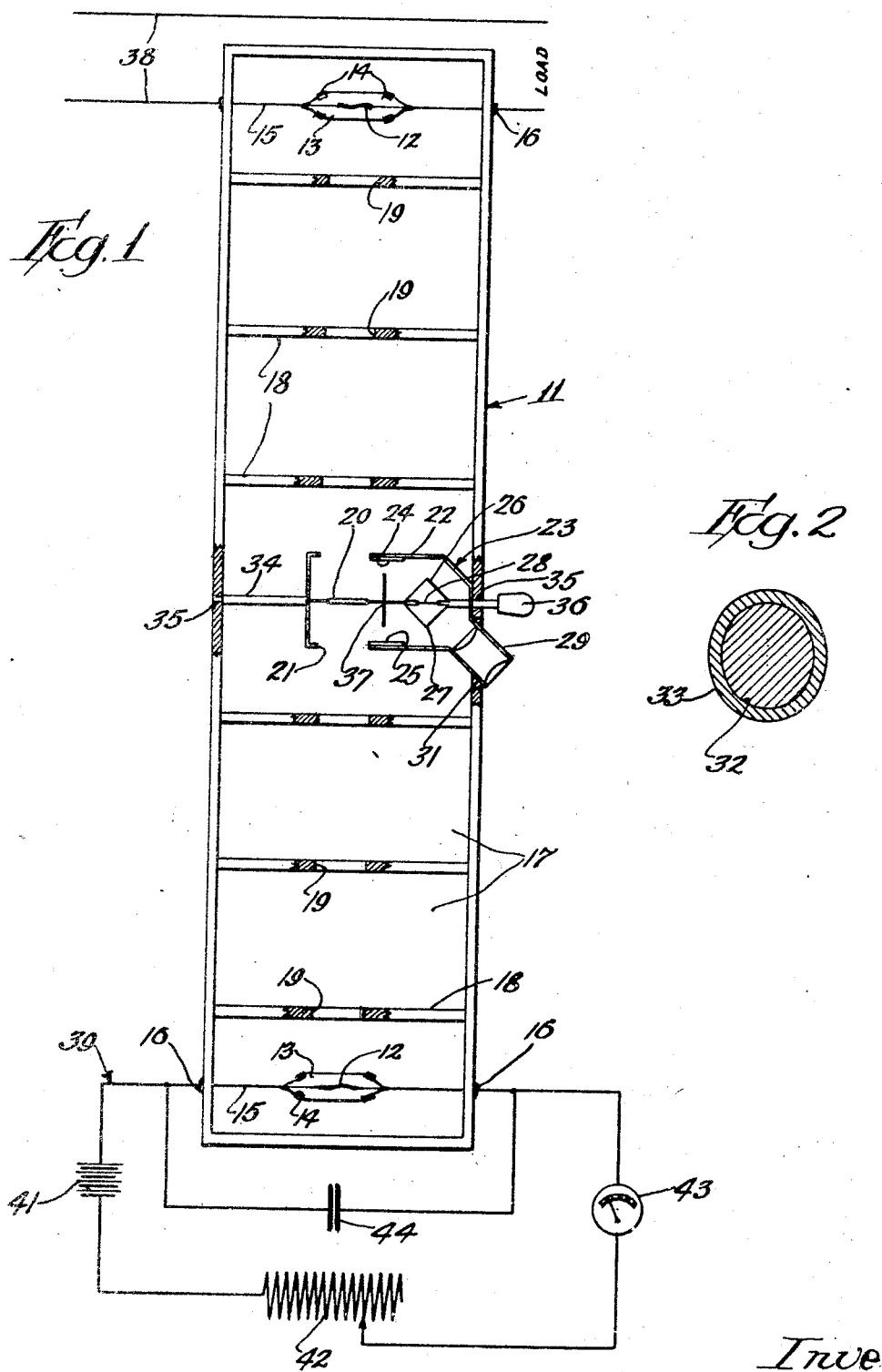

Patented May 24, 1932

1,859,469

UNITED STATES PATENT OFFICE

DONALD E. RICHARDSON, OF CHICAGO, ILLINOIS

CURRENT MEASURING DEVICE FOR HIGH FREQUENCY CIRCUITS

Application filed October 31, 1929. Serial No. 403,813.

This invention relates in general to electrical measuring apparatus and has more particular reference to a novel method and apparatus for measuring electrical currents.

The invention contemplates the measuring of electrical currents by comparing the heat or luminous effects of the unknown current on a conductor or filament with those of a known or determinable current and is particularly valuable in measuring currents of high frequencies such as are employed in electrical research work on radio, X-ray, and electro-therapeutic development. It is well known in the art to which the present invention appertains that, unless the ordinary high frequency ammeter is well shielded against capacitance effects, it introduces electrical impedance in the circuit and unless so shielded and properly calibrated for the particular circuit in which it is connected, the meter will not measure with the requisite degree of precision currents of such frequent alternations as are now common in many branches of applied electricity. It will be appreciated, however, by those skilled in this art that the effective current value or amperage of a high frequency current will, when flowing through a given ohmic resistance, produce heat at the same rate as a direct or low frequency current, and hence will be capable of producing the same luminous intensity from a conductor or filament in the circuit as that from a like conductor or filament in the direct current or low frequency circuit. An important object of the invention therefore is the provision of a novel, current measuring device which will accurately measure high frequency currents.

Another important object of the invention is the provision of a novel method of measuring high frequency currents which does not materially lengthen the circuit electrically; that is, which is practically free of capacity and does not introduce material, extra capacity in the circuit.

Another important object of the invention is the provision of improved means for measuring electrical currents which contemplate comparing the light or heat effects of the unknown current with those of a known or determinable current.

Still another important object of the invention is the provision of novel apparatus connectible in an electrical circuit having an unknown current flowing therein and connectible in another circuit having a known or determinable current flowing therein, for measuring the unknown current and protecting the apparatus and the measuring circuit from the influence of induced currents.

Yet another important object of the invention is the provision of a novel current measuring device adapted to be connected to a circuit of unknown current value and to another circuit and to measure the unknown current by measuring the current of the latter circuit when it has been adjusted to produce equal luminous or heat effects from a conductor like a conductor in the first said circuit.

Numerous other objects and advantages of the invention will be apparent as it is better understood from the following description, which, taken in connection with the accompanying drawings, discloses a preferred embodiment thereof.

In the drawings,

Figure 1 is a plan view of a current measuring device embodying the principles of the invention and showing a schematic diagram of connections, the device being shown with the cover removed and parts cut away to disclose certain construction details; and Fig. 2 is a descriptive diagram illustrating a condition visible in the current measuring device when the currents of the two circuits are not equal.

For the purpose of illustrating the invention, the drawings show a current measuring device for comparing the relative current values of two electrical circuits by comparing the luminous intensities from a conductor or filament connected in each circuit and illuminated by the heat produced by the currents flowing in the respective circuits. This current measuring device provides means for adjusting the current in one of the circuits and hence the luminous intensity and heat from the filament in the circuit and for indicating the magnitude of the current of this circuit, such indicating and adjusting means being provided in conjunction with a light or heat comparing device, which in the present instance is shown as a photometer, to indicate the relative light or heat effects from the two filaments. Thus when the photometer indicates a photometric balance, the luminous intensities, and hence the currents producing them, of the two filaments are equal and the currents in the two circuits being equal, may be observed on the indicating means.

To the end of providing apparatus for measuring current as described above, a casing 11 is shown in Fig. 1 with the cover removed to disclose certain details of construction. The casing 11 is box-like in shape and may be constructed of any suitable material such as wood, providing a housing for light filaments or conductors 12 enclosed by evacuated glass tubes 13 secured in the casing 11 by suitable clamps or brackets 14 mounted near each end of the casing. The filaments 12 are connected by electrical conductors 15 to terminals 16 suitably mounted in bushings through the sides of the casing to facilitate making external connections. The interior of the casing 11 is divided into a plurality of compartments 17 by partition walls or strips 18 of wood or other suitable material and together with the strips 18 is finished in black or otherwise treated to prevent reflection of light.

The strips 18 are suitably mounted transversely of the casing 11 such as by dovetailing and gluing the joints and have slits or apertures 19 positioned therein in alignment with the filaments 12 and a slit or aperture 21 in each side of a photometer casing 22 for passing light from the filaments to a screen 20 of parchment or other suitable, opaque material in a suitable photometer, designated generally by the reference numeral 23, suitably mounted substantially centrally within the casing and providing means for comparing the luminous intensities from the filaments 12.

The photometer 23 may of course be of any suitable type, that shown in the present embodiment of this invention comprising generally, in addition to the housing or casing 22 having the light slits or apertures 21 and the screen 20, all as mentioned above, two reflecting mirrors 24 and 25 mounted on the housing walls adjacent the slits 21 for respectively reflecting light from each side of the screen 20 to companion prisms 26 and 27 arranged with adjacent faces contacting over a circular area 28 so that light from the mirrors 24 and 25 falling on the circular area of contact 28 passes through the prisms, the remainder of the light incident upon the prisms being totally reflected. Thus light from one side of the screen 20 is reflected by the mirror 24 to the prism 26 and the centrally disposed beams of this light pass through the contacting area 28 to an eye piece or sight opening 29 arranged at an angle to the plane of the contacting area 28 and projecting outwardly, from the photometer casing 22 through an aperture 31, provided in the housing or casing 11, for convenience in observing and comparing the light intensities at each side of the screen 20. The remainder of the light from the mirror 24 is reflected and falls upon the sides of the photometer casing, being absorbed thereby. As seen through the eye piece 29, the light passed from the mirror 24 through the prism area 28 presents an illumined vision 32 of elliptical shape, as shown in Fig. 2, due to the angular disposition of the eye piece with respect to the circular area 28.

The light from the other side of the screen 20 is reflected by the mirror 25 and falls upon the prism 27, the centrally disposed beams passing through the contacting area 28 and being absorbed by the walls of the casing 22 and the remaining beams being reflected to the eye piece 29 presenting an illumined vision 33 of elliptical shape. When the intensities of the light falling on opposite sides of the screen 23 are unequal, the vision is such as that illustrated in Fig. 2 which shows concentric ellipses 32 and 33. The ellipses 32 and 33 blend when the intensities of light are equal, and the photometer is said to be balanced.

A rotatable shaft 34 provides pivotal mounting for the prisms 26 and 27 and the screen 23 to permit reversing these units for eliminating sources of error due to differences between the opposite sides of the screen. The shaft 34 has bearings at 35 in the opposite sides of the casing 11 and is provided with a handle 36 projecting outside of the casing 11 adjacent the eye piece 29 to facilitate reversing the prisms and the screen. A baffle screen 37 is provided in the photometer casing 22 and arranged between the prisms and the screen to intercept stray beams of light within the photometer.

For the purpose of illustrating its use, the novel current measuring device of the invention is shown connected to a high frequency circuit, as disclosed diagrammatically at 38, at the terminals 16 of the device, thus connecting one of the filaments 12 in the high frequency circuit, the current value of which is to be measured as will be described presently. It will be understood that the filament 12 will not materially lengthen the electric current nor will it introduce extra capacitance of more than negligible quantity in the circuit, and as stated before the heat and light effects of the high frequency current produced as a result of current flowing in the filament will be the same as those of a low frequency current. The other filament 12 is adapted to be connected in a circuit, diagrammatically shown at 39, having a determinable or known current value. The circuit 39, as shown, comprises a battery 41 or other suitable source of current supply for supplying the heating or lighting current to the filament, a rheostat 42 for varying current in the circuit 39 to produce the proper amount of light from the filament to balance the photometer 23, and a suitable current indicator or ammeter 43 for indicating the current in the circuit 39 and in the circuit 38 when the photometer indicates a photometric balance, all connected in series through terminals 16 with the filament 12. A condenser 44 is connected across the terminals 16 of the circuit 39 to eliminate the possible error of extra heating and lighting of the filament 12 by and to protect the apparatus in that circuit from induced high frequency currents such as may be caused from the circuit 38.

Thus the heating or luminous effects of the current in the circuit 38 may be compared with those of the current in the circuit 39 and the latter current accurately measured by the indicator 43 when the photometer 23 has been balanced by the rheostat 42 and this current as measured will be of equal value to that flowing in the circuit 38, providing accurate means for measuring the current in the circuit 38.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A current measuring device, comprising a potential source of light illuminated by the electrical current to be measured, another potential light source illuminated by an electrical current of determinable magnitude, and means for comparing the intensity of light from said sources, whereby to compare the relative magnitudes of the electrical currents producing them.

2. A high frequency measuring device, comprising the combination of a light filament connectible in a high frequency circuit, another light filament connectible in a second circuit, a photometer for comparing the luminous intensities of said light filaments, and means connectible in the last said circuit for independently adjusting the current flow therein to equal that in the high frequency circuit, as indicated by the photometer comparing the luminous intensities of said filaments.

3. A high frequency measuring device, comprising the combination of a light filament connectible in a high frequency circuit, another light filament connectible in a second circuit, a photometer for comparing the luminous intensities of said light filaments, means connectible in the last said circuit for independently adjusting the current flow therein to equal that in the high frequency circuit, as indicated by the photometer comparing the luminous intensities of said filaments, and means for measuring the current in the high frequency circuit by measuring the current in the other circuit when the luminous intensities of said filaments are equal.

4. A high frequency measuring device, comprising the combination of a light filament connectible in a high frequency circuit, another light filament connectible in a second circuit, a photometer for comparing the luminous intensities of said light filaments, means connectible in the last said circuit for independently adjusting the current flow therein to equal that in the high frequency circuit, as indicated by the photometer comparing the luminous intensities of said filaments, means for measuring the current in the other circuit when the luminous intensities of said filaments are equal, and a condenser for shunting the filament in the second said circuit to protect said filament against the effects of high frequency circuit currents.

5. A method of measuring an electrical current of a circuit, consisting of comparing the luminous intensities produced by a light filament connected in said circuit with that of a light filament in another circuit, and measuring the current in the last said circuit.

6. A method of measuring a high frequency current of an electrical circuit consisting of connecting a light filament in said circuit, directing the light of said filament through a photometer, connecting a light filament in an independent circuit, directing the light from the last said filament through said photometer, adjusting the luminous intensity of the last said light to equal that of the first by adjusting the current in the last said circuit, and measuring the current in the said independent circuit.

7. A method of measuring a high frequency current of an electrical circuit consisting of adjusting the light produced by a filament in an independent circuit to equal that produced by a filament in said high frequency circuit, and measuring the current in said independent circuit.

8. A method of measuring a high frequency current of an electrical circuit, consisting of comparing the luminous effects of a filament in said circuit with those of a filament in an independent circuit having a determinable value of current.

DONALD E. RICHARDSON.